July 24, 1951     W. J. PROPHETER     2,561,754
LAWN RAKE WITH RECEPTACLE
Filed Aug. 16, 1946     2 Sheets-Sheet 1
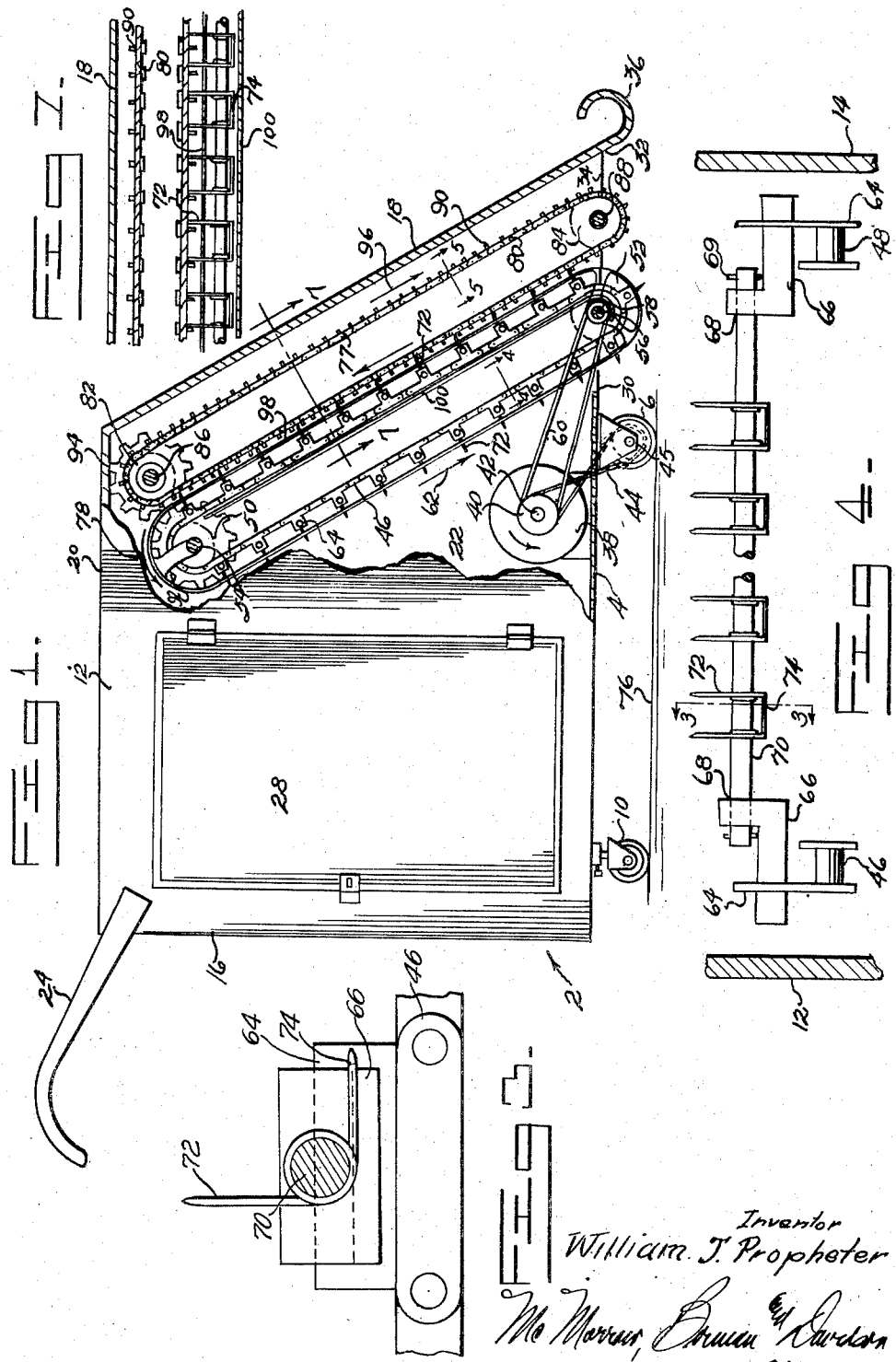
Inventor
William J. Propheter
Attorneys

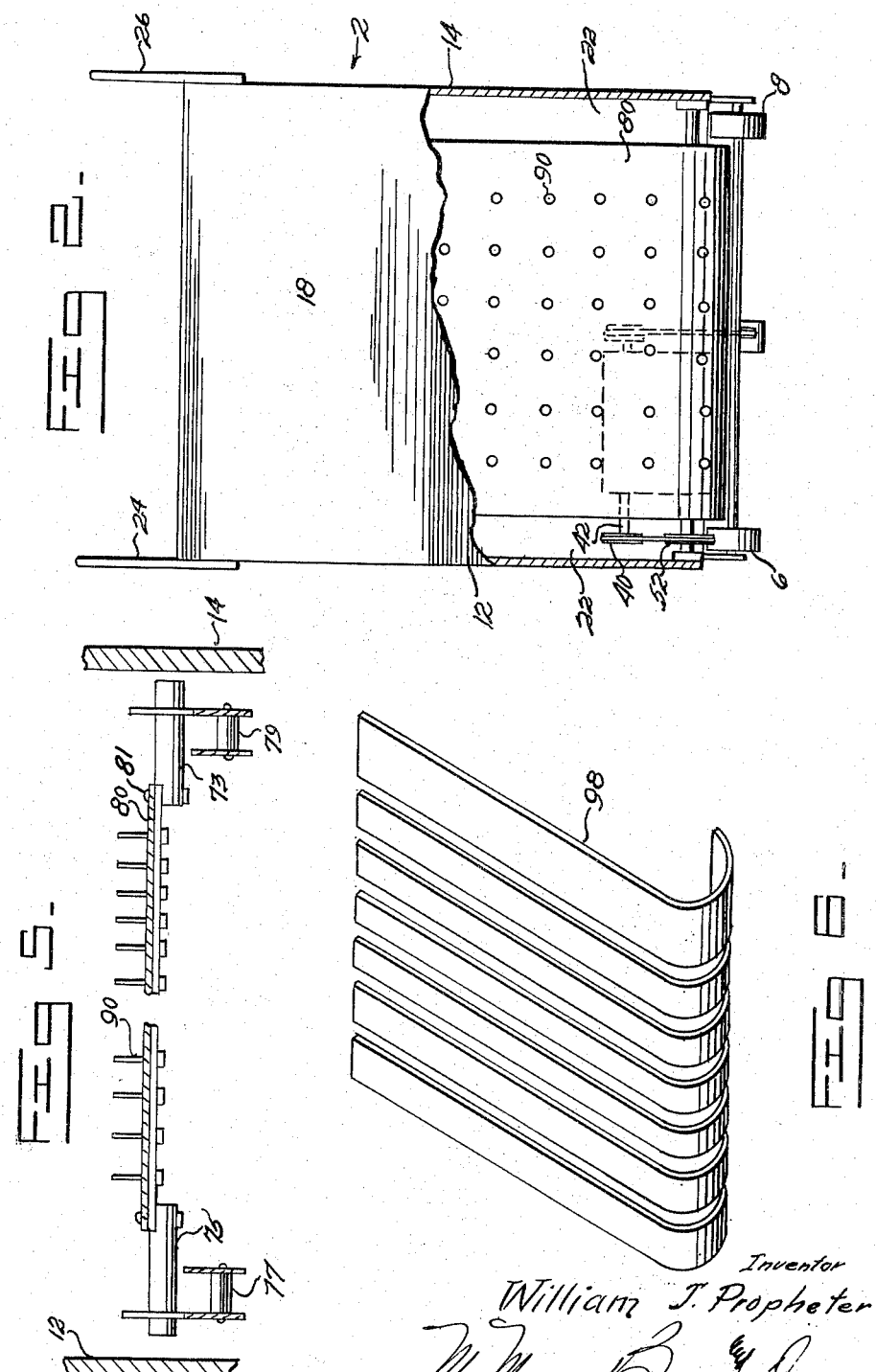

Patented July 24, 1951

2,561,754

UNITED STATES PATENT OFFICE 2,561,754

LAWN RAKE WITH RECEPTACLE

William J. Propheter, Sterling, Ill.

Application August 16, 1946, Serial No. 691,079

4 Claims. (Cl. 56—345)

This invention relates to rakes for lawns and the like.

An object of the invention is to provide a lawn rake which has a receptacle for leaves mounted on wheels, and means for raking the leaves into the receptacle.

Another object of the invention is to provide a lawn rake which may be pushed or guided by an operator to rake up leaves into a receptacle carried thereon, and which has a plurality of projections like rake teeth cooperating with projections on a canvas belt, for gathering up leaves on a lawn, and conveying them into the receptacle.

A further object of the invention is to provide a lawn rake which may be powered by means of a motor mounted on its frame, and which is simple in design, relatively inexpensive to manufacture, and effective in operation.

Other objects and advantages of the invention will be apparent from the following description of a preferred embodiment thereof as illustrated in the accompanying drawing, and in which, Figure 1 is a partly broken out side elevation of my improved lawn rake, Figure 2 is a front end elevation as seen from the right side of Figure 1, Figure 3 is an enlarged transverse sectional view taken on line 3—3 of Figure 4 and showing a portion of a sprocket chain and rake tooth, Figure 4 is an enlarged fragmentary transverse sectional view of the machine taken on line 4—4 of Figure 1 and showing a portion of the bottom conveyor, Figure 5 is an enlarged fragmentary transverse sectional view of the machine taken on line 5—5 of Figure 1 and showing a portion of the top conveyor, Figure 6 is a perspective view of a portion of the top guard, and, Figure 7 is a transverse sectional view taken on line 7—7 of Figure 1.

Reference is now had to the illustrations in which similar reference characters denote similar parts throughout the several views. As shown, there is a housing generally indicated at 2 and including a base or floor plate 4 supported on front wheels 6 and 8 and rear wheel 10 which is swiveled to allow for steering and turning the housing 2.

On the base plate 4 there are side walls 12 and 14, rear wall 16, and sloping front wall 18, with a top or roof member 20 mounted in the walls to form an enclosed chamber 22 within the housing. Handles 24 and 26 allow the device to be pushed or guided. A door 28 opens to allow access to the inside of chamber 22 for the removal of leaves and grass therefrom, the rearward portion of the chamber adjacent the door 28 forming the grass and leaf receptacle of the device.

The forward portion of the floor member 4 is cut away between locations 30 and 32 to form an aperture 34, and the lower end 36 of the front wall 18 is bent outwardly and rounded as shown in Figure 1. A motor 38 is supported inside the chamber 22 on the floor 4, and has a pulley 40, mounted on its shaft 42, which is rotated in the direction of the arrow, for driving the wheel 6 by means of a power transmission belt 44, which is entrained over a pulley 45 fixed to the wheel 6 so as to propel the housing 2. A pair of sprocket chains 46 and 48 are looped around sprocket wheels at 50 and 52 which in turn are rotatably mounted on shafts 54 and 56, respectively, journaled in the side walls 12 and 14 of the housing, or other suitable support. A pulley 58 fast on shaft 56 is driven through power transmission belt 60 extending around pulley 58 and the power pulley 40 as shown in Figure 1, thereby driving the two sprocket chains 46 and 48 in the direction of the arrow 62.

Links of the sprocket chains 46 and 48 have outstanding lugs 64 which are apertured to receive bent pins 66 having lateral apertures at 68 as seen in Figure 4, for the reception of transverse shafts 70 journaled therein by cotter pins 69. Spaced spring rake tines or teeth 72 are affixed transversely to the shafts 70 in a conventional manner, as shown in Figure 4, with an end portion 74 extending beyond the shafts 70 as shown, and forming a lateral bridging portion connecting those ends of the tines 72. It is thus apparent that as the pick-up conveyor assembly carrying the rake teeth 72 moves in the direction indicated by the arrow 62, the effect will be to pick up leaves from the ground surface 76 and carry them upward upon the forward surface of the rake tooth assembly and upward in the direction of the arrow 78, tossing them into the leaf and grass receptacle inside the door 28.

To assist in keeping the thus picked up leaves and grass on the rake tooth assembly, a continuous canvas belt 80 is secured at its side edges by rivets 81 to projections 73 and 75 carried on links of sprocket chains 77 and 79, respectively, as in Figure 5, which are supported about sprocket wheels 82 and 84 supported on shafts 86 and 88, the shafts being journaled in the walls 12 and 14 of the housing 2 or in any other suitable manner. Rivets 90 project out of the canvas belt 80. Gear wheels 92 and 94, fast on shafts 54 and 86 respectively, intermesh, so that as the motor 38 rotates, it also drives the canvas belt 80 in the direction of the arrow 96, causing the belt to assist in keeping the picked up leaves and grass between the teeth 72 and the belt 80, so it is carried up to be dumped as indicated by arrow 78 into the hopper or receptacle adjacent door 28. A top guard member 98, shown in detail in Figure 6, and also in Figures 1 and 3, is provided, the member 98 being elliptical and encompassing the shaft 70 and associated teeth, as seen in Figure 1. The guard member is mounted in the housing in any suitable manner (not shown). The bottom guard member 100 is mounted in the housing in a position so that it bears against the projection 74 of the rake teeth assemblies and causes the teeth 72 to project outwardly, as shown in Figures 1 and 3, during the upward travel of the sprocket chains and the teeth 72, thereby preventing the leaves from dropping down to the ground. The guard members 100 is mounted in the housing, in a manner (not shown).

This machine can be made in any size desired, and is obviously very handy in gathering leaves and grass from lawns and beneath trees.

Although I have described a preferred embodiment of my invention in specific terms, it is to be understood that various changes may be made in size, shape, material and arrangement without departing from the spirit and scope of the invention as claimed.

I claim:

1. An ambulatory rake comprising an ambulatory housing having a bottom wall formed with a forward intake opening, and sidewalls, a pair of forwardly and rearwardly spaced upper transverse shafts journalled in said sidewalls, a pair of forwardly and rearwardly spaced lower transverse shafts journaled in said sidewalls within said intake opening, said pair of upper shafts being displaced rearwardly with respect to said intake opening, a pick-up conveyor assembly trained over and between the rearward shafts and declining forwardly to said intake opening, said pick-up conveyor assembly having outwardly projecting teeth whereby on upward movement of the forward flight of said conveyor assembly material is picked up in said intake opening and carried upwardly and rearwardly, a material retaining belt trained over and between the forward shafts of said pairs in front of said pick-up belt, said retaining belt having a rearward flight parallel to and spaced forwardly from the forward flight of said pick-up belt with the teeth on the forward flight of said pick-up belt reaching into close proximity to the rearward flight of said retaining belt, and means operatively connected to said pick-up and retaining belts for simultaneously driving said belts.

2. An ambulatory rake comprising an ambulatory housing having a bottom wall formed with a forward intake opening, and sidewalls, a pair of forwardly and rearwardly spaced upper transverse shafts journalled in said sidewalls, a pair of forwardly and rearwardly spaced lower transverse shafts journalled in said sidewalls within said intake opening, said pair of upper shafts being displaced rearwardly with respect to said intake opening, a pick-up conveyor trained over and between the rearward shafts and declining forwardly to said intake opening, said pick-up conveyor having outwardly projecting teeth whereby on upward movement of the forward flight of said pick-up conveyor material is picked up in said intake opening and carried upwardly and rearwardly, a material retaining belt trained over and between the forward shafts of said pairs in front of said pick-up conveyor, said retaining belt having a rearward flight parallel to and spaced forwardly from the forward flight of said pick-up conveyor with the teeth on the forward flight of said pick-up conveyor reaching into close proximity to the rearward flight of said retaining belt, and means operatively connected to said pick-up conveyor and retaining belt for simultaneously driving said belt and conveyor, said teeth on said pick-up conveyor being laterally spaced from each other in rows extending longitudinally of said pick-up conveyor, and a guard plate extending along said pick-up conveyor and disposed in the space between and parallel to the forward flight of the pick-up conveyor and the rearward flight of said retaining belt, said guard plate being formed with longitudinal slots through which the rows of teeth on the forward flight of said pick-up conveyor project forwardly, the forward face of said guard plate being spaced rearwardly from the rearward flight of said retaining belt and cooperating with the rearward flight of said retaining belt to form a passage into which the teeth on the forward flight of said pick-up conveyor project for moving material upwardly between said conveyor and belt from said intake opening.

3. An ambulatory rake comprising an ambulatory housing having a bottom wall formed with a forward intake opening, and sidewalls, a pair of forwardly and rearwardly spaced upper transverse shafts journalled in said sidewalls, a pair of forwardly and rearwardly spaced lower transverse shafts journalled in said sidewalls within said intake opening, said pair of upper shafts being displaced rearwardly with respect to said intake opening, a pick-up conveyor trained over and between the rearward shafts and declining forwardly to take intake opening, said pick-up conveyor having outwardly projecting teeth whereby on upward movement of the forward flight of said pick-up conveyor material is picked up in said intake opening and carried upwardly and rearwardly, a material retaining belt trained over and between the forward shafts of said pairs in front of said pick-up conveyor, said retaining belt having a rearward flight parallel to and spaced forwardly from the forward flight of said pick-up conveyor with the teeth on the forward flight of said pick-up conveyor reaching into close proximity to the rearward flight of said retaining belt, and means operatively connected to said pick-up conveyor and retaining belt for driving said conveyor and belt, said teeth on said pick-up conveyor being laterally spaced from each other in rows extending longitudinally thereof, and a guard plate extending along said pick-up conveyor and disposed in the space between and parallel to the forward flight of the pick-up conveyor and the rearward flight of said retaining belt, said guard plate being formed with longitudinal slots through which the rows of teeth on the forward flight of said pick-up conveyor project forwardly, the forward face of said guard plate being spaced rearwardly from the rearward flight of said retaining belt and cooperating with the rearward flight of said retaining belt to form a passage into which the teeth on the forward flight of said pick-up conveyor project for moving material upwardly between said conveyor and belt from said intake opening, said retaining belt having pins projecting on its outward side and positioned so that the pins on the rearward flight thereof extend through the guard plate slots and occupy positions between the teeth on the forward flight of the pick-up conveyor and cooperate in moving material upwardly.

4. An ambulatory rake comprising an ambulatory housing having a bottom wall formed with a forward intake opening, and sidewalls, a pair of forwardly and rearwardly spaced upper transverse shafts journalled in said sidewalls, a pair of forwardly and rearwardly spaced lower transverse shafts journalled in said sidewalls within said intake opening, said pair of upper shafts being displaced rearwardly with respect to said intake opening, a pick-up conveyor trained over and between the rearward shafts and declining forwardly to said intake opening, said pick-up conveyor having outwardly projecting teeth whereby on upward movement of the forward flight of said pick-up conveyor material is picked up in said intake opening and carried upwardly and rearwardly, a material retaining belt trained over and between the forward shafts of said pairs in front of said pick-up conveyor, said retaining belt having a rearward flight parallel to and spaced forwardly from the forward flight of said pick-up conveyor with the teeth on the forward flight of said pick-up conveyor reaching into close proximity to the rearward flight of said retaining belt, and means operatively connected to said pick-up conveyor and retaining belt for simultaneously driving said conveyor and belt, said teeth on said pick-up conveyor being laterally spaced from each other in rows extending longitudinally of said pick-up conveyor, and a guard plate extending along said pick-up conveyor and disposed in the space between and parallel to the forward flight of the pick-up conveyor and the rearward flight of said retaining belt, said guard plate being formed with longitudinal slots through which the rows of teeth on the forward flight of said pick-up conveyor project forwardly, the forward face of said guard plate being spaced rearwardly from the rearward flight of said retaining belt and cooperating with the rearward flight of said retaining belt to form a passage into which the teeth on the forward flight of said pick-up conveyor project for moving material upwardly between said belts from said intake opening, said pick-up conveyor being of open skeleton form and said guard plate being imperforate except for said slots.

WILLIAM J. PROPHETER.

REFERENCES CITED

The following references are of record in the file of this patent:

UNITED STATES PATENTS

| Number | Name | Date |
| --- | --- | --- |
| 1,200,092 | Elliott | Oct. 3, 1916 |
| 1,237,543 | Morrison | Aug. 21, 1917 |
| 1,459,731 | Henderson | June 26, 1923 |
| 1,819,432 | Mickle | Aug. 18, 1931 |
| 2,402,201 | Martin | June 18, 1946 |

FOREIGN PATENTS

| Number | Country | Date |
| --- | --- | --- |
| 492,182 | Germany | Feb. 20, 1930 |